United States Patent
Slack

(10) Patent No.: US 8,477,021 B2
(45) Date of Patent: Jul. 2, 2013

(54) WORKSITE PROXIMITY WARNING AND COLLISION AVOIDANCE SYSTEM

(76) Inventor: John Slack, Priddis (CA)

( * ) Notice: Subject to any disclaimer, the term of this patent is extended or adjusted under 35 U.S.C. 154(b) by 278 days.

(21) Appl. No.: 12/910,970

(22) Filed: Oct. 25, 2010

(65) Prior Publication Data

US 2012/0098653 A1    Apr. 26, 2012

(51) Int. Cl.
    *B60Q 1/00*    (2006.01)
(52) U.S. Cl.
    USPC .......................... 340/435; 340/903; 342/70
(58) Field of Classification Search
    USPC ........ 340/435, 436, 438, 903; 342/70; 701/50
    See application file for complete search history.

(56) References Cited

U.S. PATENT DOCUMENTS

| | | | |
|---|---|---|---|
| 4,100,529 A | 7/1978 | Evans | |
| 6,069,581 A * | 5/2000 | Bell et al. | 342/70 |
| 6,160,493 A * | 12/2000 | Smith | 340/903 |
| 6,429,789 B1 | 8/2002 | Kiridena et al. | |
| 6,583,734 B2 | 6/2003 | Bates et al. | |
| 6,731,202 B1 * | 5/2004 | Klaus | 340/436 |
| 7,327,235 B2 * | 2/2008 | Nagata | 340/435 |
| 7,656,311 B2 | 2/2010 | Holmes et al. | |
| 2002/0032511 A1 * | 3/2002 | Murakami et al. | 701/50 |
| 2005/0128060 A1 * | 6/2005 | Rennick et al. | 340/435 |
| 2006/0187009 A1 * | 8/2006 | Kropinski et al. | 340/435 |
| 2009/0033540 A1 | 2/2009 | Breed et al. | |
| 2009/0043462 A1 | 2/2009 | Stratton et al. | |
| 2009/0066538 A1 | 3/2009 | Thomas et al. | |
| 2009/0083100 A1 | 3/2009 | Darby et al. | |
| 2009/0108840 A1 | 4/2009 | Givens | |
| 2009/0259400 A1 | 10/2009 | Coats et al. | |
| 2009/0259401 A1 | 10/2009 | Edwards et al. | |

FOREIGN PATENT DOCUMENTS

| | | |
|---|---|---|
| JP | 04-330123 | 11/1992 |
| JP | 05-325068 | 12/1993 |
| JP | 10-183696 | 7/1998 |
| JP | 2001-064992 | 3/2001 |

* cited by examiner

*Primary Examiner* — John A Tweel, Jr.
(74) *Attorney, Agent, or Firm* — Maxey Law Offices; Stephen Lewellyn

(57) ABSTRACT

A proximity warning and collision avoidance for a machine on a worksite operating near obstacles is disclosed. The proximity warning system includes an operator interface including first group of visual indicators including a low level indicator and a high level indicator, a second group of visual indicators including a low level indicator and a high level indicator, an audio indicator operable at a first volume and at a second volume, and operator inputs configured to receive selections from an operator. The proximity warning system is configured to provide both low level and high level alarms to an operator when an obstacle approaches or enters a safe zone, and when the machine approaches and enters a hazard zone.

7 Claims, 3 Drawing Sheets

WORKSITE PROXIMITY WARNING AND COLLISION AVOIDANCE SYSTEM

FIELD OF THE INVENTION

The present invention relates generally to proximity warning systems, and more particularly, relating to a worksite proximity warning system to avoid vehicle collisions.

BACKGROUND OF THE INVENTION

In the construction and mining industry heavy equipment such as, for example, wheel loaders, excavators, motor graders, bulldozers, and other types of earth moving machines are used to perform a variety of tasks on a worksite. Some tasks require movement between locations on the worksite, and because of the poor visibility provided to an operator of the machines, ground personnel, vehicles and other worksite hazards it can be difficult to safely maneuver the worksite. In certain instances, ground personnel or vehicles may become too close to the machine without the operator being aware of their presence. In other circumstances, the operator may maneuver the machine dangerously close to obstacles or hazards that cannot be readily seen from the operator's cab of the machine. Collision incidents may cause damage to the machine, property, equipment and injury or death to the operator and ground personnel.

There exists numerous systems, methods and devices for vehicle collision avoidance. An example of position tracking and proximity warning system is described in U.S. Pat. No. 7,656,311; an example of a vehicle hazard and integrated navigation system is described in U.S. Pat. No. 6,583,734; a vehicle collision avoidance system is described in U.S. Patent Application Publication Number 2009/0259401; and a worksite zone mapping and collision avoidance system is described in U.S. Patent Application Publication Number 2009/0043462, the entirety of each are incorporated herein by reference.

While the existing systems, devices and methods fulfill their particular objectives, a need remains for a proximity warning and collision avoidance system which includes a display of a simple, not distracting construction while effectively alerting an operator of a proximity warning event and which requires an operator to acknowledge the alarm. Further, there is a need for a proximity warning and collision avoidance system that enables an operator to request assistance.

SUMMARY OF THE INVENTION

In general, in one aspect, proximity warning and collision avoidance system is provided. The system includes an established safe zone within a work environment within which a machine is safe to work. An established hazard zone within the work environment within which the machine is restricted. An operator interface comprising a first group of visual indicators including a low level indicator and a high level indicator, a second group of visual indicators including a low level indicator and a high level indicator, an audio indicator operable at a first volume and at a second volume, and operator inputs configured to receive selections from an operator. A controller in communication with the operator interface, and configured to control the operator interface to illuminate the low level indicator of the first group of visual indicators and to operate the audio indicator at the first volume when a hazard approaches within a predetermined distance from a perimeter of the established safe zone. The controller is further configured to control the operator interface to illuminate the high level indicator of the first group of visual indicators and to operate the audio indicator at the second volume when the hazard enters within the perimeter of the established safe zone. The controller is further configured to control the operator interface to illuminate the low level indicator of the second group of indicators and to operate the audio indicator at the first volume when the machine approaches within a predetermined distance from a perimeter of the established hazard zone. The controller further is configured to control the operator interface to illuminate the high level indicator of the second group of indicators and to operate the audio indicator at the second volume when the vehicle enters within the perimeter of the established hazard zone.

In general, in another aspect, a method of warning a machine operator the proximity of obstacles relative to a machine is provided. The method includes establishing a safe zone within a work environment within which the machine is safe to work and establishing at least one hazard zone within a work environment within which the machine is restricted. The method further includes providing a low level alarm to an operator when a hazard approaches within a predetermined distance from a perimeter of the safe zone, providing a high level alarm to an operator when the hazard enters within the perimeter of the safe zone, providing a low level alarm to an operator when the machine approaches within a predetermined distance from a perimeter of the hazard zone and providing a high level alarm to an operator when the machine enters within the perimeter of the hazard zone.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings.

DETAILED DESCRIPTION OF THE INVENTION

In this description, references to "one embodiment" or "an embodiment" mean that the featuring being referred to is included in at least one embodiment of the invention. Moreover, separate references to "one embodiment" in this description do not necessarily refer to the same embodiment. Illustrated embodiments are not mutually exclusive, unless so stated and except as will be readily apparent to those of ordinary skill in the art. Thus, the invention may include any variety of combinations and/or integrations of the embodiments described herein.

Figure 1:
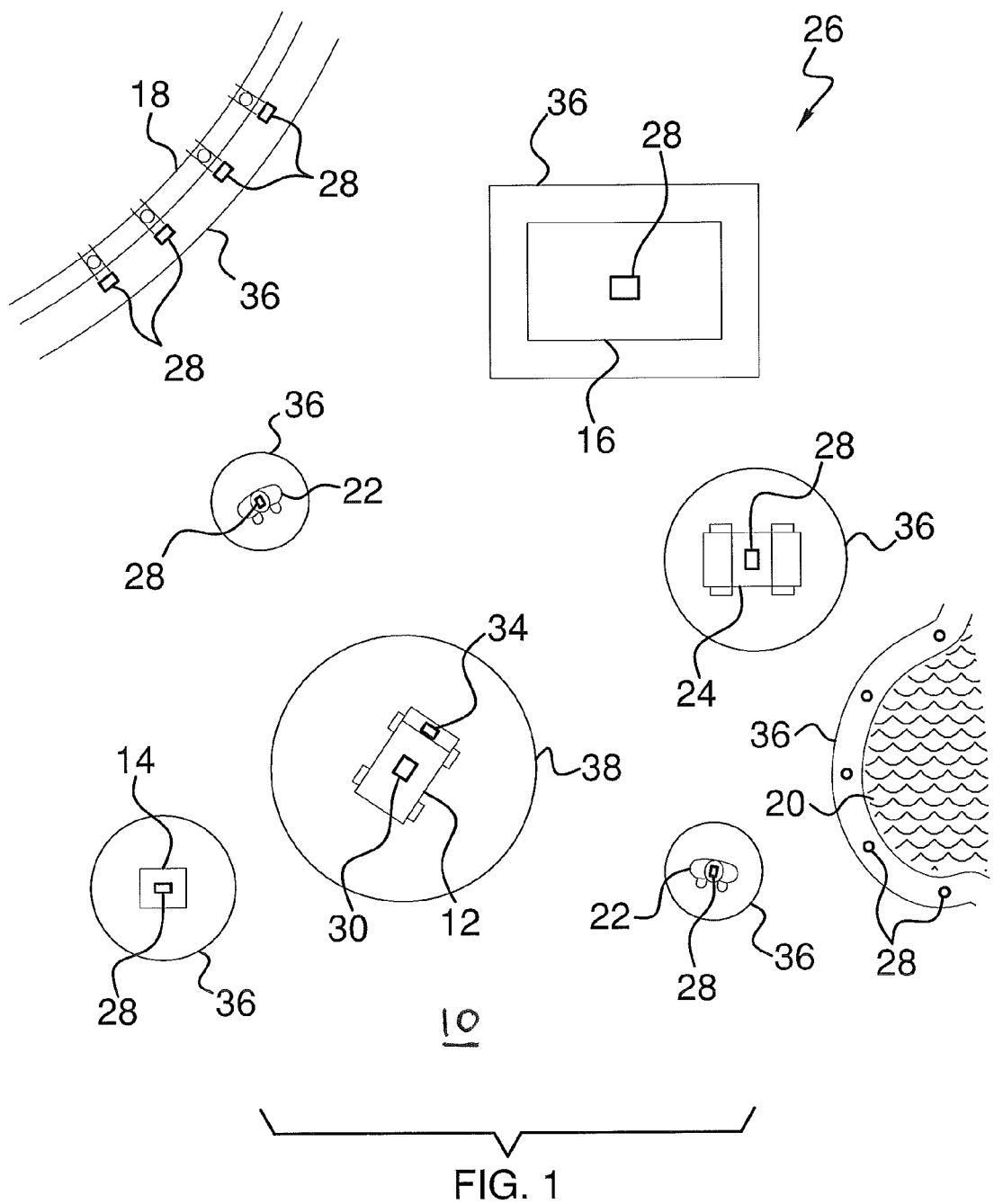
FIG. 1 is a diagrammatic illustration of an exemplary worksite comprising a proximity warning and collision avoidance system in accordance with the principles of the invention.

In FIG. 1 there is diagrammatically illustrated an exemplary worksite 10 with a mobile machine 12 performing a task at the worksite. The worksite 10 may include, for example, an oil field, a mine site, a landfill, a construction site, a roadway worksite, or any other type of worksite. The task being performed may require the mobile machine 12 to traverse the worksite. Mobile machine 12 may embody any type of driven machine that may be used at worksite 10. For example, mobile machine 12 may embody an excavator, a grader, a backhoe, a bulldozer, or any other type of driven machine.

Worksite 10 may include any number of stationary or mobile obstacles or hazards that the mobile machine 12 may encounter. Obstacles at the worksite may include, for example, a hazardous area 14 such as an oil well head, a fuel site or an explosive operation; a facility 16 such as a building, storage trailer or a utility structure 18 such as an overhead power line, underground gas, water and sewer pipes. The obstacles at the worksite 10 may also include, for example, a natural obstacle 20 such as a body of water, a cliff, a steep grade or a tree. The obstacles at the worksite 10 may also include, for example, ground personnel 22 and/or other mobile vehicles 24. Obstacles at the worksite 10 may also include other mobile machines 12 (not shown).

In an embodiment, in order to prevent collision between the mobile machine 12 and any one of a number of obstacles on the worksite 10, a proximity warning system 26 may include components that cooperate to receive signals from the obstacles and/or mobile machine 12. The proximity warning system 26 may establish a hazard zone or electronic fence 36 about each obstacle at the worksite 10 and may establish a safe zone 38 about the mobile machine 12. That is, the proximity warning system 26 may associate at least one artificial hazard zone or electronic fence 36 with each of the hazardous areas 14, facilities 16, utility structures 18, natural obstacles 20, ground personnel 22 and mobile vehicles 24.

In an embodiment, the proximity warning system 26 may include one or more obstacle location signal emitters 28 associated with each obstacle. For example, ground personnel 22 may carry a transmitter module 28; hazardous areas 14, facilities 16, utility structures 18, natural obstacles 20 may include one or more transmitter modules positioned about the obstacle; and mobile vehicles 24 may be fitted with a transmitter module 28. Each transmitter module 28 operates to broadcast an obstacle position signal indicating the presence of the associated obstacle. Transmitter module 28 may be configured to broadcast an obstacle position signal that may represent the varying degree of collision avoidance associated with the trespassing thereof by the mobile machine 12. For example, a stationary obstacle like a fire hydrant may cause minor damage to the mobile machine 12, while a cliff may cause more severe damage to the machine 12 and/or personal injury to the operator or injury or death from collision with ground personnel. Transmitter module 28 may be configured to broadcast an obstacle position signal that may represent varying dimensions of hazard areas 36. For example, the dimension of a hazard area associated with ground personal may be different than the dimension of a hazard area associated with a utility structure, etc.

Figure 3:
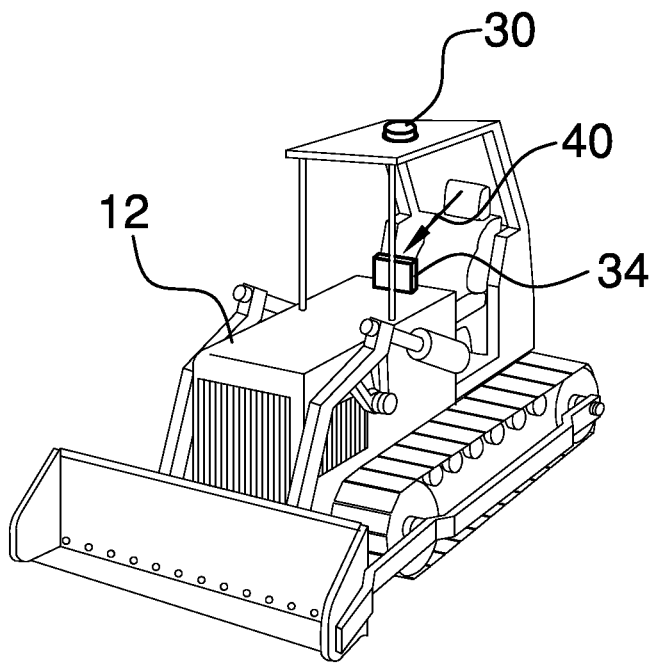
FIG. 3 is a diagrammatic illustration of an exemplary machine.
Figure 2:
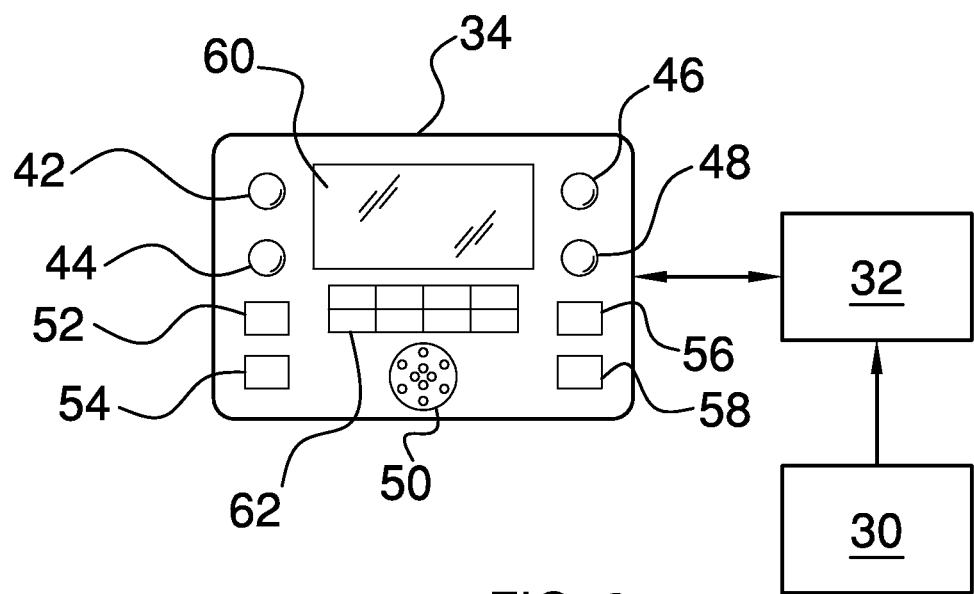
FIG. 2 is a diagrammatic illustration of an operator interface.

The proximity warning system 26 may further include a receiving module 30 configured to receive obstacle position signals transmitted by respective transmitter modules 28. Receiving module 30 is disposed or otherwise carried by the mobile machine 12. A controller 32 is in communication with the receiving module 30 and an operator interface 34, as seen in FIG. 2. Operator interface 34 is positioned within a region of the cab of the mobile machine 12 and along an operator's line of sight 40, as illustrated in FIG. 3. The controller 32 is configured to operate the operator interface 34 to operate alarm indicators provided by operator interface 34 as a function of a preprogrammed control, operator input and received obstacle position signals as will be discussed in further detail below.

Referring to FIG. 3, operator interface 34 is a of a simple construction to prevent distraction of the mobile machine operator. Operator interface 34 includes a first group of visual indicators comprising lights 42 and 44, a second group of visual indicators comprising lights 46 and 48, and an audio indicator comprising speaker 50. Operator interface 34 may further include a first set of user inputs comprising buttons 52 and 54 that are associated with the first group of visual indicators. Operator interface 34 may further include a second set of user inputs comprising buttons 56 and 58 that are associated with the second group of visual indicators. In embodiments, operator interface 34 may also include a display screen, such as an LCD screen 60 and a keypad 62. In embodiments, Keypad 62 and LCD screen 60 can be used to program controller 32 according to various worksite maps, worksite hazards, etc.

The first group of visual indicators are activated to alert the operator of the mobile machine 12 of a first proximity warning event, such as ground personnel 22 or vehicles 24 approaching or entering the established safe zone 38 bounding the mobile machine 12. The second group of visual indicators are activated to alert the operate of the mobile machine 12 of a second proximity warning event, such as the mobile machine 12 approaching or entering an established hazard zone 36 bounding an obstacle.

In a first proximity warning event, the proximity warning system 26 operates to alert the operator of the mobile machine 12 that ground personnel 22 or vehicle 24 is at the edge of the established safe zone 38. The controller 32 determines the ground personnel 22 or vehicle 24 is at the edge of the established safe zone 38 as a function of the position signal broadcasted by the associated transmitter module 28 that is received by the receiving module 30. In this event, light 42 is illuminated along with the playing of an alert tone from speaker 50 at a first volume level. Light 42 may be illuminated in a flashing pattern or steadily illuminated. The operator must acknowledge the proximity warning event by depressing the "acknowledgement" button 52 on the display 34. Pressing button 52 will turn the alarm off for a predetermined period of time allowing the mobile machine 12 to cross the established hazard zone 36 or allow time for the ground personal 22 or vehicle 24 to pass by the established safe zone 38. The period of time is determined by safety personal and can by stacked if necessary, i.e. push once for 30 seconds, push twice for 60 seconds. In certain situations, the ground personal 22 or vehicle 24 must remain in close proximity to the mobile machine 12. In these situations, the operator may enter an alarm exception allowing ground personal 22 or vehicle 24 to work within the established safe zone 38 without the proximity warning system 26 continuously alerting the operator of the proximity warning event. The operator may select an exception by depressing the "select" button 54. The exceptions to operating protocol may be programmed by safety personal on an as-needed basis.

In second proximity warning event, the proximity warning system 26 operates to alert the operator of the mobile machine 12 that ground personal 22 or vehicle 24 has entered the established safe zone 38. The controller 32 determines the ground personnel 22 or vehicle 24 is within the established safe zone 38 as a function of the position signal broadcasted by the associated transmitter module 28 that is received by the receiving module 30. In this event, light 44 is illuminated along with the playing of an alert tone from speaker 50 at a second volume level. Light 44 may be illuminated in a flashing pattern or steadily illuminated. The second volume level is louder than the first volume level. This alarm event indicates to the operator to come to an emergency full stop to prevent incidents between the mobile machine 12 and hazards on the worksite 10. This event may also be acknowledged and bypassed as discussed above with respect to the first proximity warning event.

In embodiments, the proximity warning system 26 may be interconnected with the drive train and/or control systems of mobile vehicle 12 to provide collision avoidance. In this embodiment, the mobile machine 12 may be automatically disabled to an emergency full stop upon determining a second proximity warning event has occurred.

In a third proximity warning event, the proximity warning system 26 operates to alert the operator the mobile machine 12 is at the edge of the established hazard zone 36. The controller 32 determines mobile machine is at the edge of the established hazard zone 36 as a function of the position signal broadcasted by the associated transmitter module 28 that is received by the receiving module 30. In this event, light 46 is illuminated along with the playing of an alert tone from speaker 50 at a first volume level. Light 46 may be illuminated in a flashing pattern or steadily illuminated. The operator must acknowledge the proximity warning event by depressing the "acknowledgement" button 56 on the display 34. Pressing button 56 will turn the alarm off for a predetermined period of time allowing the mobile machine 12 to cross the established hazard zone 36. The period of time is determined by safety personal and can by stacked if necessary, i.e. push once for 30 seconds, push twice for 60 seconds. In certain situations, mobile machine 12 may need to cross through or perform a task in an established hazard zone 26. In these situations, the operator may enter an alarm exception allowing mobile machine 12 to work within the established hazard zone 36 without the proximity warning system 26 continuously alerting the operator of the proximity warning event. The operator may select an exception by depressing the "select" button 58. The exceptions to operating protocol may be programmed by safety personal on an as-needed basis.

In fourth proximity warning event, the proximity warning system 26 operates to alert the operator the mobile machine 12 has entered an established hazard zone 36. The controller 32 determines the mobile machine 12 is within the established hazard zone 36 as a function of the position signal broadcasted by the associated transmitter module 28 that is received by the receiving module 30. In this event, light 48 is illuminated along with the playing of an alert tone from speaker 50 at a second volume level. Light 48 may be illuminated in a flashing pattern or steadily illuminated. The second volume level is louder than the first volume level. This alarm event indicates to the operator to come to an emergency full stop to prevent incidents between the mobile machine 12 and hazards on the worksite 10. This event may also be acknowledged and bypassed as discussed above with respect to the third proximity warning event.

In embodiments, the proximity warning system 26 may be interconnected with the drive train and/or control systems of mobile vehicle 12 to provided collision avoidance. In this embodiment, the mobile machine 12 may be automatically disabled to an emergency full stop upon determining a fourth proximity warning event has occurred.

Figure 4:
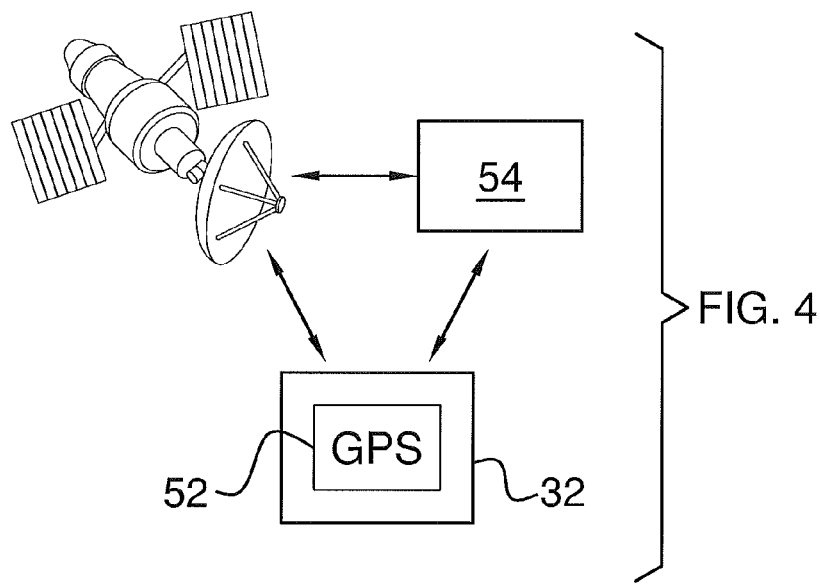
FIG. 4 is a block diagram of a control system.
Figure 5:
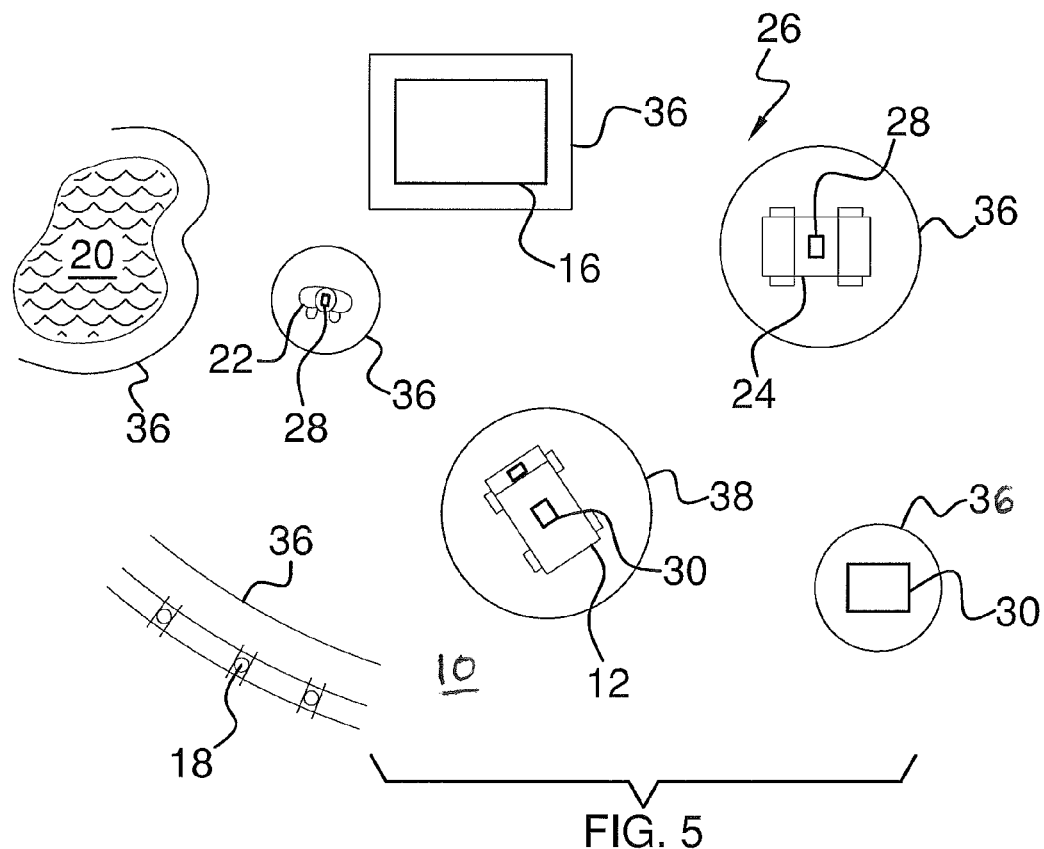
FIG. 5 is a diagrammatic illustration of an exemplary worksite in accordance with an embodiment of the invention.

In a more complex embodiment, the proximity warning system 26 may include a GPS 52 system in communication with the controller 32. The GPS system 52 and the controller 32 are in communication with a central control 54, FIG. 4. In order to facilitate proximity warning with the obstacles at the worksite 10 the controller 32 may be programmed with a terrain map of the worksite 10. The terrain map may include, for example, work surface data describing ground elevation, consistency, etc., at various locations at the worksite 10. The terrain map may further include the locations of mobile machines 12 and the obstacles at the worksite 10. The locations may be represented by, for example, site coordinates. The terrain map, including the obstacles at the worksite 10 and mobile machine 12, may be represented as data in memory of the controller 32. Further, data representing the obstacles and mobile machine 12 may include site coordinates corresponding to their locations on the worksite grid. The terrain map may also associate at least one artificial hazard zone or electronic fence 36 with each of the hazardous areas 14, facilities 16, utility structures 18, natural obstacles 20, and thus eliminating the use of associated emitter modules for these obstacles, as seen in FIG. 5.

In embodiments, the integrated GPS system may be used to monitor the activity of the mobile machine 12 on the worksite 10 by supervisors and/or safety personal. The activity may also record or alert supervisors and/or safety personal of proximity warning events.

In embodiments, the proximity warning system 26 may include an assistance request feature and an emergency response feature to notify supervisors or emergency response personnel that the operator of the mobile machine 12 needs assistance. The integrated GPS may also provide exact location detail of the mobile machine when the assistance is requested.

In an embodiment, the proximity warning system 26 may permit for custom programming to any worksite scenario that is necessary. Job specific programs may be entered into the system and controller 32 using operator interface 34. As equipment is moved to a different task on the worksite the supervisor may enter into the system a corresponding task code allowing equipment to be used safely at any location on the worksite.

A number of embodiments of the present invention have been described. Nevertheless, it will be understood that various modifications may be made without departing from the spirit and scope of the invention. Accordingly, other embodiments are within the scope of the following claims.

What is claimed is:

1. A proximity warning and collision avoidance system, comprising:
an established safe zone within a work environment within which a machine is safe to work;
an established hazard zone within the work environment within which the machine is restricted;
an operator interface comprising a first group of visual indicators including a low level indicator and a high level indicator, a second group of visual indicators including a low level indicator and a high level indicator, an audio indicator operable at a first volume and at a second volume, and operator inputs configured to receive selections from an operator;
a controller in communication with said operator interface, and configured to control the operator interface to illuminate said low level indicator of said first group of visual indicators and to operate said audio indicator at said first volume when a hazard approaches within a predetermined distance from a perimeter of said established safe zone;
said controller further configured to control the operator interface to illuminate said high level indicator of said first group of visual indicators and to operate said audio indicator at said second volume when the hazard enters within said perimeter of said established safe zone;
said controller further configured to control the operator interface to illuminate said low level indicator of said second group of indicators and to operate said audio indicator at said first volume when the machine approaches within a predetermined distance from a perimeter of said established hazard zone; and
said controller further configured to control the operator interface to illuminate said high level indicator of said second group of indicators and to operate said audio indicator at said second volume when the machine enters within said perimeter of said established hazard zone.

2. The system of claim 1, further comprising:
at least one transmitter module associated with the hazard;
a receiver module in communication with said at least one transmitter module; and
said controller is in further communication with said receiver module.

3. The system of claim 1, further comprising:
a global positioning system
a terrain map including location details of hazards; and
said controller is programmed to include said location details of hazards, and said controller is in further communication with said global positioning system.

4. A method of warning a machine operator the proximity of obstacles relative to a machine, comprising:
establishing a safe zone within a work environment within which the machine is safe to work;
establishing at least one hazard zone within a work environment within which the machine is restricted;
providing a low level alarm to an operator when a hazard approaches within a predetermined distance from a perimeter of said safe zone;
providing a high level alarm to an operator when the hazard enters within said perimeter of said safe zone;
providing a low level alarm to an operator when the machine approaches within a predetermined distance from a perimeter of said hazard zone; and
providing a high level alarm to an operator when the machine enters within said perimeter of said hazard zone.

5. A machine, comprising:
an operator cab;
a proximity warning system including:
an established safe zone within a work environment within which a machine is safe to work;
an established hazard zone within the work environment within which the machine is restricted;
an operator interface comprising a first group of visual indicators including a low level indicator and a high level indicator, a second group of visual indicators including a low level indicator and a high level indicator, an audio indicator operable at a first volume and at a second volume, and operator inputs configured to receive selections from an operator;
a controller in communication with said operator interface, and configured to control the operator interface to illuminate said low level indicator of said first group of visual indicators and to operate said audio indicator at said first volume when a hazard approaches within a predetermined distance from a perimeter of said established safe zone;
said controller further configured to control the operator interface to illuminate said high level indicator of said first group of visual indicators and to operate said audio indicator at said second volume when the hazard enters within said perimeter of said established safe zone;
said controller further configured to control the operator interface to illuminate said low level indicator of said second group of indicators and to operate said audio indicator at said first volume when the machine approaches within a predetermined distance from a perimeter of said established hazard zone; and
said controller further configured to control the operator interface to illuminate said high level indicator of said second group of indicators and to operate said audio indicator at said second volume when the machine enters within said perimeter of said established hazard zone.

6. The method of claim 4, further comprising:
providing an acknowledgement input; and
pausing said one of said alarms for a time period upon the machine operator pressing said acknowledgement input.

7. The method of claim 6, wherein in said pausing step pressing said acknowledgment input one or more subsequent times stacks said time period.

* * * * *